(12) United States Patent
Wang et al.

(10) Patent No.: US 12,348,380 B2
(45) Date of Patent: Jul. 1, 2025

(54) NETWORK MANAGEMENT SYSTEM, METHOD, AND APPARATUS, AND ELECTRONIC DEVICE

(71) Applicant: New H3C Technologies Co., Ltd., Hangzhou (CN)

(72) Inventors: Bin Wang, Beijing (CN); Wenyan Wang, Beijing (CN); Lihui Sun, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 18/003,936

(22) PCT Filed: Oct. 19, 2021

(86) PCT No.: PCT/CN2021/124558
§ 371 (c)(1),
(2) Date: Dec. 30, 2022

(87) PCT Pub. No.: WO2022/242024
PCT Pub. Date: Nov. 24, 2022

(65) Prior Publication Data
US 2024/0297828 A1 Sep. 5, 2024

(30) Foreign Application Priority Data
May 17, 2021 (CN) .......................... 202110532166.8

(51) Int. Cl.
*H04L 41/14* (2022.01)
*H04L 41/0869* (2022.01)

(52) U.S. Cl.
CPC ........ *H04L 41/145* (2013.01); *H04L 41/0869* (2013.01)

(58) Field of Classification Search
CPC ........................... H04L 41/145; H04L 41/0869
See application file for complete search history.

(56) References Cited

U.S. PATENT DOCUMENTS

| | | | |
|---|---|---|---|
| 10,892,960 B1 | 1/2021 | Emelyanov | |
| 2014/0046645 A1* | 2/2014 | White | H04L 63/1433 |
| | | | 703/13 |

(Continued)

FOREIGN PATENT DOCUMENTS

| | | |
|---|---|---|
| CN | 107193546 A | 9/2017 |
| CN | 110209719 A | 9/2019 |

(Continued)

*Primary Examiner* — Emmanuel L Moise
*Assistant Examiner* — Zia Khurshid
(74) *Attorney, Agent, or Firm* — McDonnell Boehnen Hulbert & Berghoff LLP

(57) ABSTRACT

The examples of the present disclosure provide a network management system, method, apparatus, and an electronic device. Wherein the network management system comprises a support unit, a data management unit, a business service unit and a display unit. The business service unit includes multiple groups of microservice subunits, each of the microservice subunits is used to provide a type of microservice, and the microservices provided by each group of the microservice subunits are jointly used to realize one management function. The support unit performs installation and deployment on all the microservice subunits through the same installation and deployment logic, and the support unit performs operation management on all the microservice subunits through the same operation management logic. The data management unit stores data of all the microservice subunits through the same data storage logic, and the data management unit encapsulates the access logic of each type of data into the same access logic. The display unit displays a main interface. The operation of network management can be simplified.

10 Claims, 4 Drawing Sheets

(56) References Cited

U.S. PATENT DOCUMENTS

| | | |
|---|---|---|
| 2019/0363934 A1 | 11/2019 | Li |
| 2019/0370263 A1* | 12/2019 | Nucci .................. G06F 16/254 |
| 2020/0042315 A1 | 2/2020 | Gupta |
| 2020/0396225 A1 | 12/2020 | Bhatia |
| 2021/0021533 A1 | 1/2021 | Guim Bernat |
| 2021/0070333 A1* | 3/2021 | Chen ..................... G06Q 50/40 |

FOREIGN PATENT DOCUMENTS

| | | |
|---|---|---|
| CN | 110809017 A | 2/2020 |
| CN | 112733359 A | 4/2021 |
| CN | 112787708 A | 5/2021 |
| CN | 112994958 A | 6/2021 |
| JP | 2000049788 A | 2/2000 |
| JP | 2003249953 A | 9/2003 |
| JP | 2016066945 A | 4/2016 |

* cited by examiner

NETWORK MANAGEMENT SYSTEM, METHOD, AND APPARATUS, AND ELECTRONIC DEVICE

The present disclosure claims priority to Chinese patent application No. 202110532166.8 filed with the China National Intellectual Property Administration on May 17, 2021 and entitled "Network management system, method, apparatus, and electronic device", and is a U.S. National Phase Application under 35 U.S.C. § 371 of International Application No. PCT/CN2021/124558 filed Oct. 19, 2021, and entitled "Network management system, method, and apparatus, and electronic device" both of which are incorporated herein by reference in their entirety.

TECHNICAL FIELD

The present disclosure relates to the field of communication technology, and in particular to a network management system, method, apparatus, and an electronic device.

BACKGROUND

With the gradual increase of network scale and the increasing complexity of network structure, the network management has become more and more difficult. In order to facilitate users to effectively manage the network, related technologies provide a variety of products with different management functions, such as network management products, controller products, and intelligent analysis products, etc. . . . Users can run multiple products with different management functions at the same time according to actual needs to jointly manage the network.

However, products with different management functions in related technologies are independent from each other, and users need to use different products in turn for network management according to actual conditions, resulting in cumbersome operations and poor user experience.

SUMMARY

The purpose of examples of the present disclosure is to provide a network management system, method, apparatus, and an electronic device to implement simplified network management operations. Specifically, the detailed technical solutions are as follows.

In a first aspect of examples of the present disclosure, a network management system is provided, which includes a support unit, a data management unit, a business service unit, and a display unit.

The business service unit includes multiple groups of microservice subunits.

Each of the microservice subunits provides a type of microservice, and the microservices provided by each group of the microservice subunits are jointly used to implement a management function.

The support unit performs installation and deployment on all the microservice subunits through the same installation and deployment logic, so as to provide a unified deployment platform for all the microservice subunits.

In addition, the support unit performs operation management on all the microservice subunits through the same operation management logic, so as to provide a unified operation platform for all the microservice subunits.

The data management unit stores data of all the microservice subunits through the same data storage logic, so as to provide a unified data storage service for all the microservice subunits.

In addition, the data management unit encapsulates the access logic of each type of data into the same access logic, and enables all the microservice subunits to access each type of data through the same access logic.

The display unit displays a main interface, and provides an interface for jumping to a functional interface of each of the microservice subunits in the main interface, so as to provide a unified portal framework service for all the microservice subunits.

In one possible example, the display unit is further to determine a menu item corresponding to an access permission of an account logging in to the network management system according to a pre-stored correspondence between access permissions and menu items; and display the determined menu item in the main interface.

In one possible example, the display unit is further to determine an interface element corresponding to an access permission of an account logging in to the network management system in the main interface according to a pre-stored correspondence between access permissions and interface elements; reset attributes of the determined interface element in the main interface; and display the reset main interface, wherein the interface element includes a menu item and/or a widget.

In one possible example, the support unit is further to perform unified message modeling and encapsulation on protocols used in all the microservices provided by all the microservice subunits, so as to provide a unified protocol channel service for all the microservice subunits.

In one possible example, the support unit is further to obtain logs generated by all the microservices provided by all the microservice subunits, and perform log management on all obtained logs through a same log management logic, so as to provide a unified log service for all the microservice subunits.

In one possible example, the data management unit is further to configure a universally unique identifier UUID for each network device in a target network managed by the network management system, so that the management function jointly implemented by the microservices provided by each group of the microservice subunits enables to manage the network device according to the UUID of the network device.

In a second aspect of the present disclosure, a network management method is provided, which is applied to the network management system of any one of the foregoing first aspect. The method includes:
determining target network parameters;
configuring the target network parameters as network parameters of a simulation network that is constructed based on a target network managed by the network management system;
obtaining a simulation running state of the simulation network;
determining whether the simulation running state matches a target running state; configuring the target network parameters as network parameters of the target network if the simulation running state matches the target running state.

In one possible example, the method further includes:
if the simulation running state does not match the target running state, re-determining new target network parameters, and returning to perform the step of configuring the target network parameters as the network parameters of a simulation network that is constructed based on a target network managed by the network management system.

In one possible example, determining the target network parameters includes:
obtaining a target running state;
inputting the target running state to an inference model to obtain target network parameters output by the inference model, wherein the inference model is a pre-trained model for inferring the network parameters of a network according to the input target running state.

In one possible example, the method further includes:
obtaining current network parameters and a current running state of the target network;
inputting the current running state to the inference model to obtain inference network parameters output by the inference model;
updating the inference model according to the differences between the inference network parameters and the current network parameters.

In a third aspect of the examples of the present disclosure, a network management apparatus is provided, which is applied to the network management system of any one of the foregoing first aspect. The apparatus includes:
a parameter determining module to determine target network parameters;
a simulation module to configure the target network parameters as network parameters of a simulation network that is constructed based on a target network managed by the network management system;
a verification module to obtain a simulation running state of the simulation network;
a judging module to determine whether the simulation running state matches a target running state;
a configuration module to configure the target network parameters as network parameters of the target network if the simulation running state matches the target running state.

In a fourth aspect of the present disclosure, an electronic device is provided, including:
a memory to store a computer program;
a processor to perform the method in the second aspect described above when executing the program stored on the memory.

In a fifth aspect of the present disclosure, a computer readable storage medium is provided. The computer readable storage medium stores a computer program thereon which, when executed by a processor, causes the processor to implement the method in the foregoing second aspect.

The beneficial effects of the examples of the present disclosure are as follows:

The network management system, method, apparatus, and electronic device provided in the examples of the present disclosure can divide the services used to implement multiple management functions into multiple groups of microservices based on a microservice architecture, and these microservices are provided by the microservice subunits. In this way, a variety of different management functions can be realized in a network management system. In addition, the support unit unifies the installation and deployment logic and the operation management logic of all microservice subunits, thereby providing a unified deployment platform and operation platform for all microservice subunits, so as to realize the unification of different management functions in a support layer. Further, the data of each of the microservice subunits is unitarily stored through a data management unit, and at the same time, the access logic of different types of data is unified, so that the data can be communicated between different microservice subunits, so as to realize the unification of different management functions in a data layer.

Further, the main interface is displayed through a display layer, and an interface for jumping to a functional interface of each of the microservice subunits is provided in the main interface, so that users can access the functional interfaces of different microservice subunits through a unified portal, so as to realize the unification of different management functions in a display layer. Therefore, a variety of different management functions can be integrated into an organic whole in the support layer, data layer, business layer, and display layer. Users can effectively implement a variety of different management functions through a unified interface, which can simplify the operation of the network management.

Of course, any product or method implementing the present disclosure does not necessarily need to achieve all advantages described above at the same time.

BRIEF DESCRIPTION OF THE DRAWINGS

In order to more clearly describe the technical solution of the examples of the present disclosure or of the prior art, drawings needed in the examples and the prior art will be briefly described below. Obviously, the drawings described below are for only some examples of the present disclosure, one of ordinary skills in the art can also obtain other examples based on these drawings.

DETAILED DESCRIPTION

The technical solutions according to examples in the present disclosure will be clearly and completely described with reference to the drawings of the examples of the present disclosure. Obviously, the examples described are only some instead of all of the examples of the present disclosure. All other examples obtained by those of ordinary skills in the art based on all the examples in the present disclosure are within the scope of the present disclosure.

In order to more clearly describe the network management method provided in the examples of the present disclosure, a possible application scenario of the network management method provided in the examples of the present disclosure will be exemplarily described below. It can be understood that the following example is only one possible application scenario of the network management method provided in the examples of the present disclosure. In other possible examples, the network management method provided in the examples of the present disclosure can also be applied to other possible application scenarios, and the following examples do not make any limitations on this.

In related technologies, relevant personnel can log into a management platform installed with a program product for managing a network (hereinafter referred to as a network management product), a program product for controlling a network (hereinafter referred to as a controller product), and a program product for intelligent analysis of a network (hereinafter referred to as an intelligent analysis product). According to the actual needs of users, one or more of the network management product, the controller product, and the intelligent analysis product are started to manage the network.

Exemplarily, the relevant personnel may start the intelligent analysis product to perform prediction, fault detection and other analysis on a network, and obtain the analysis result output by the intelligent analysis product. The relevant personnel determine whether the network parameters of the network need to be changed according to the analysis results and their own actual experience. If the relevant personnel think that the network parameters of the network need to be changed, they can start the network management product to change the network parameters of the network.

However, in this method, the network management product, the controller product, and intelligent analysis product are independent from each other, and relevant personnel are required to switch the products used according to actual conditions and/or experience, resulting in cumbersome operations and poor user experience.

Figure 1:
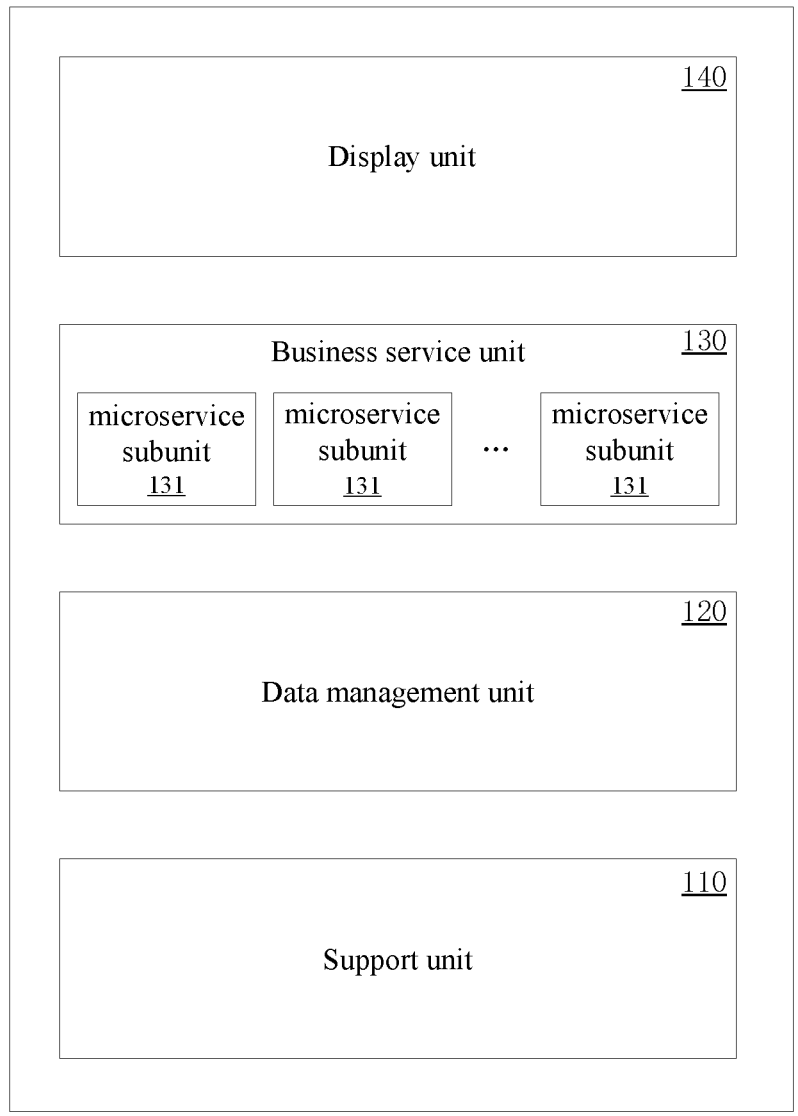
FIG. 1 is a schematic structure diagram of a network management system according to an example of the present disclosure.

Based on this, an example of the present disclosure provides a network management system, which may be shown in FIG. 1. FIG. 1 is a schematic structure diagram of the network management system according to an example of the present disclosure, which may include a support unit 110 and a data management unit 120, a business service unit 130, and a display unit 140.

Wherein the business service unit 130 includes multiple groups of microservice subunits 131.

Each of the microservice subunits 131 provides a type of microservice, and the microservices provided by each group of the microservice subunits 131 are jointly used to implement one management function.

The support unit 110 performs installation and deployment on all the microservice subunits 131 through the same installation and deployment logic, so as to provide a unified deployment platform for all the microservice subunits.

In addition, the support unit 110 performs operation management on all the microservice subunits 131 through the same operation management logic, so as to provide a unified operation platform for all the microservice subunits.

The data management unit 120 stores data of all the microservice subunits 131 through the same data storage logic, so as to provide a unified data storage service for all the microservice subunits 131.

In addition, the data management unit 120 encapsulates an access logic of each type of data into the same access logic, and enables all the microservice subunits 131 to access each type of data through the same access logic.

The display unit 140 displays a main interface, and provides an interface for jumping to a functional interface of each of the microservice subunits in the main interface, so as to provide a unified portal framework service for all the microservice subunits 131.

Using this example, the services used to implement multiple management functions can be divided into multiple groups of microservices based on a microservice architecture, and these microservices are provided by the microservice subunits. In this way, a variety of different management functions can be realized in a network management system. In addition, the support unit unifies the installation and deployment logic and the operation management logic of all microservice subunits, thereby providing a unified deployment platform and operation platform for all microservice subunits, so as to realize the unification of different management functions in a support layer. Further, the data of each of the microservice subunits is unitarily stored through a data management unit, and at the same time, the access logic of different types of data is unified, so that the data can be communicated between different microservice subunits, so as to realize the unification of different management functions in a data layer. Further, the main interface is displayed through a display layer, and an interface for jumping to a functional interface of each of the microservice subunits is provided in the main interface, so that users can access the functional interfaces of different microservice subunits through a unified portal, so as to realize the unification of different management functions in a display layer. Therefore, a variety of different management functions can be integrated into an organic whole in the support layer, data layer, business layer, and display layer. Users can effectively implement a variety of different management functions through a unified interface, which can simplify the operation of the network management.

Wherein, each microservice subunit 131 may be composed of one or more virtual machines and/or containers (such as docker containers), and the microservices provided by each of the microservice subunits 131 are microservices for realizing one management function in the services, for example, monitoring services, topology services, report services, etc.

Different microservice subunits 131 may be deployed on the same physical device, or may be deployed on different physical devices, which is not limited in this example. Exemplarily, all the microservice subunits 131 may be deployed on the same physical device, or may be separately deployed on different physical devices in a cluster, or part of the microservice subunits 131 may be deployed on one physical device in the cluster, and another part of the microservice subunits may be deployed on another physical device in the cluster. Wherein the cluster may refer to a cluster formed by multiple physical devices that can be used to implement the network management system provided by the examples of the present disclosure.

According to different application scenarios, the microservice subunits 131 included in the business service unit 130 may be different. Exemplarily, in one possible example, the business service unit 130 may include three groups of microservice subunits 131, wherein the microservices provided by a group of microservice subunits 131 are jointly used to implement the functions of the network management product, the microservices provided by a group of microservice subunits 131 are jointly used to implement the functions of the controller product, and the microservices provided by a group of microservice subunits 131 are jointly used to implement the functions of the intelligent analysis product.

In other possible examples, the business service unit 130 may also include only two groups of microservice subunits 131 or 4 groups or more of microservice subunits 131, which is not limited in this example.

The support unit 110, the data management unit 120, and the display unit 140 will be separately described below.

Figure 2:
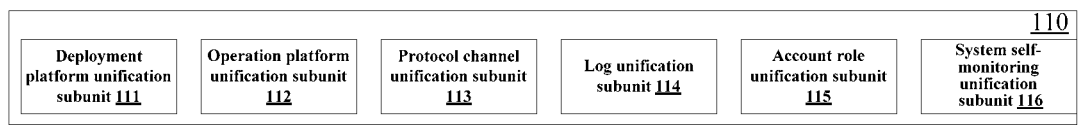
FIG. 2 is a schematic structure diagram of a support unit in a network management system according to an example of the present disclosure.
Figure 3:
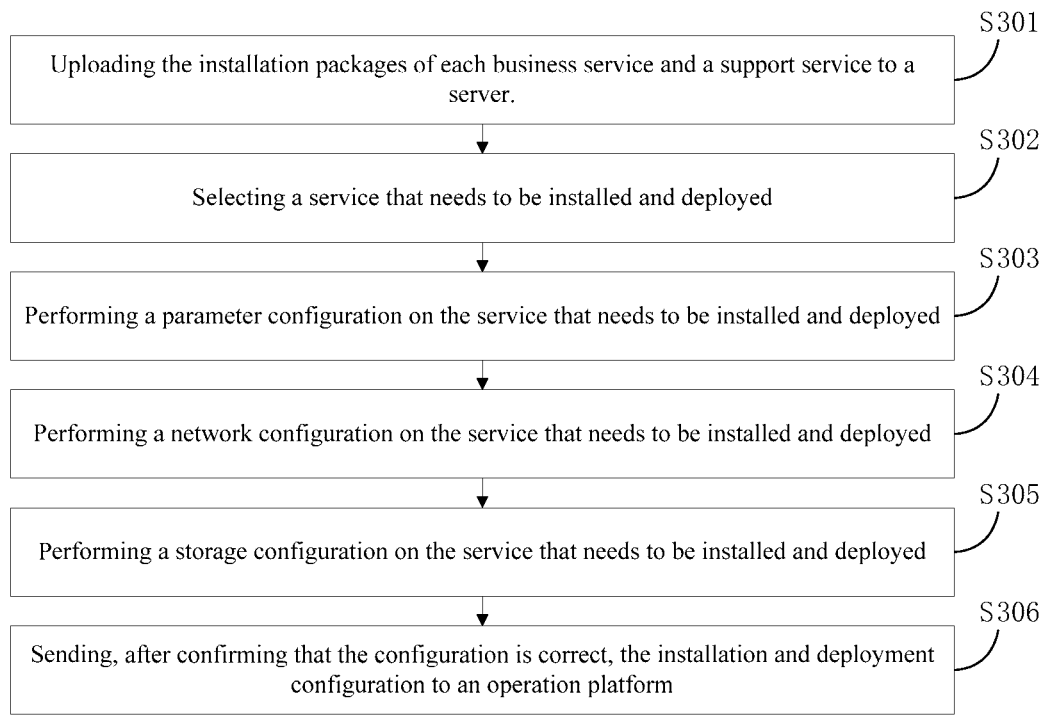
FIG. 3 is a schematic flow diagram of a service deployment method according to an example of the present disclosure.

In one possible example, the structure of the support unit 110 may be as shown in FIG. 2, including a deployment platform unification subunit 111, an operation platform unification subunit 112, a protocol channel unification subunit 113, a log unification subunit 114, an account role unification subunit 115 and a system self-monitoring unification subunit 116. In other possible examples, the support unit 110 may also include only some subunits in all the subunits shown in FIG. 2, and may also include sub-units not shown in FIG. 2, which is not limited in this example. For example, in one possible example, the support unit 110 may only include a deployment platform unification subunit 111, an operation platform unification subunit 112, a protocol channel unification subunit 113, and an account role unification subunit 115, but not include the log unification subunit 114 and the system self-monitoring unification subunit 116 describe above.

Wherein the deployment platform unification subunit 111 is to perform installation and deployment on all the microservice subunits 131 through the same installation and deployment logic, so as to provide a unified deployment platform for all the microservice subunits. The same installation and deployment logic can be different according to different actual needs. For example, in one possible example, refer to FIG. 3, which is a schematic flow diagram of a service deployment method according to an example of the present disclosure. The method may include:

S301, uploading installation packages of each business service and a support service to a server.

In this example, each business service refers to a service for realizing any management function, such as a service for realizing the function of the network management product (hereinafter referred to as a network management service), a service for realizing the function of the controller product (hereinafter referred to as a control service) and a service for realizing the function of the intelligent analysis product (hereinafter referred to as an intelligent analysis service).

The format of the installation package can be different according to different application scenarios. For example, it can be a compressed package format, and the installation package can include an installation and deployment configuration file, such as a configuration file of json format (a lightweight data exchange format) or YAML format (a format used to represent data serialization); an installation and deployment script, such as a script of shell or py (python, a programming language); a container mirror, such as a container mirror of tar (a compressed format); a database script, such as a database script of sql format (structured query language).

S302, selecting a service that needs to be installed and deployed.

It can be decompressed according to the uploaded installation package and parsed and displayed according to preset specifications, so that the user inputs a selection instruction according to the displayed content, and selects the service that needs to be installed and deployed according to the selection instruction input by the user.

S303: performing a parameter configuration on the service that needs to be installed and deployed.

The parameter configuration can be performed on the service according to a parameter configuration instruction input by the user, or the parameter configuration can be performed according to a preset rule, which is not limited in this example.

S304: performing a network configuration on the service that needs to be installed and deployed.

The deployment platform unification subunit 111 can maintain a subnet IP address pool. The subnet IP address pool includes multiple IP addresses. The deployment platform unification subunit 111 can use the subnet IP address pool to allocate IP addresses to the installed and deployed service, so as to perform the network configuration on the installed and deployed service.

S305: performing a storage configuration on the service that needs to be installed and deployed.

Local storage resources and/or shared storage resources can be set for the service that needs to be installed and deployed. Wherein, the local storage resources may refer to storage resources that are local to physical devices used to implement the service and used to store data of the service, and shared storage resources may refer to storage resources used to store data of multiple different services.

S306: sending, after confirming that the configuration is correct, the installation and deployment configuration to an operation platform.

Wherein the installation and deployment configuration is used for presenting the configuration for the service that needs that needs to be installed and deployed, including but not limited to the parameter configuration performed in the foregoing S303, the network configuration performed in the foregoing S304, and the storage configuration performed in the foregoing S305. After sending the installation and deployment configuration, the deployment platform unification subunit 111 can also invoke the script corresponding to a parameter setting to initialize a database and load and start each service container mirror according to the parameter setting in the installation and deployment configuration.

It can be understood that the installation and deployment logic of products with different management functions may be different. If users need to use products with different management functions, it is necessary to use different installation and deployment logics to install and deploy different products, that is, users need to learn multiple different installation and deployment logics, resulting in higher learning costs of users. However, the present disclosure unifies the installation and deployment logics of all the microservice subunits 131, so that users can realize multiple different management functions without learning multiple different installation and deployment logics, so as to effectively reduce the learning cost of users.

The operation platform unification subunit 112 is to perform operation management on all the microservice subunits 131 through the same operation management logic, so as to provide a unified operation platform for all the microservice subunits. The operation platform unification subunit 112 may provide a unified container operation mode, unified operation scheduling and management for all the microservice subunits 131 in the business service unit 130, thereby effectively simplifying the operation management of each business service. The operation platform unification subunit 112 may be composed of the following systems: an operation system, such as a Linux operation system; a microservice management arrangement system, such as K8S (kubernets, a cluster management tool); and a container system, such as a Docker container system. In addition, the operation platform unification subunit 112 may operate in a stand-alone mode or in a cluster mode. Support services and the microservices provided by each of the microservice subunits 131 are sent to the microservice management arrangement system through the unified deployment platform, and the microservice management arrangement system performs unified operation scheduling on the microservices provided by each of the microservice subunits 131, and performs a unified operation management for the start, stop, restart, etc. of the microservices provided by each of microservice subunits 131, and runs on the operation system in the form of a container.

The protocol channel unification subunit 113 is to perform unified message modeling and encapsulation on protocols used in all the microservices provided by all the microservice subunits 131, so as to provide a unified protocol channel service for all the microservice subunits 131. For example, the protocol channel unification subunit 113 may unitarily manage the protocol channel in the form of a connection pool, including but not limited to the creation, destruction, channel, etc. of the protocol channel. The microservices provided by each of the microservice subunits 131 use the protocol through SDK (Software Development Kit) or REST (a software architecture style) interface.

The log unification subunit 114 is to obtain running logs generated by all the microservices provided by all the microservice subunits 131, and perform log management on all obtained logs through the same log management logic, so as to provide a unified log service for all the microservice subunits 131. Wherein the obtained logs may include, but not limited to: operation logs of the microservices provided by each of the microservice subunits 131, running logs of the microservices provided by each of the microservice subunits 131, and running logs of the supporting service itself.

In one possible example, the microservices provided by each of the microservice subunits 131 publish operation logs through a message bus, and the log unification subunit 114 obtains the operation logs by monitoring the message bus. The log unification subunit 114 can collect the running logs of the microservices provided by each of the microservice subunits 131 and the running logs of the support service itself through a log plug-in. And the obtained operation logs and running logs are unitarily output to a search engine database for storage management. All types of logs support conditional retrieval, export, and automatic cleaning according to time or the amount of disk space occupied.

The account role unification subunit 115 is to provide a unified account role for the microservices provided by each of the microservice subunits 131, so that only a set of unified account roles is required in various network scenarios. Exemplarily, the account role unification subunit 115 may perform unified role permission management, where the role permission management may include but not limited to operations such as operator account, tenant, role, permission, group creation, modification, and deletion, etc.

It can be understood that permissions can be composed of functional operation permissions and data permissions. The set of permissions constitutes a role. Multiple operator accounts can be defined as groups, that is, multiple operator accounts can be defined as a group according to actual needs. Permissions are assigned to operator accounts or groups through roles. Operator accounts can obtain group roles. For example, assuming that operator account 1 belongs to group A, and group A is assigned to role a, then operator account 1 has all the permissions of role a. The collection of data in the system constitutes a tenant, and the operator account can be bound to the tenant to obtain permissions related to the data in the tenant.

The microservices provided by each of the microservice subunits 131 can obtain the permissions of the currently logged-in operator account through a SDK or REST interface, so as to use the obtained permissions to control access to the resources required by the provided microservices.

The system self-monitoring unification subunit 116 provides a unified self-monitoring service for the microservices provided by each of the microservice subunits 131 by monitoring the running platform and analyzing the running log. Assuming that each of the microservice subunits 131 is deployed on different physical devices in the cluster, when installing and deploying each of the microservice subunits 131, the self-monitoring service can be deployed on each physical device in the cluster, and the CPU, memory, disk resources, running states, and real-time utilization allocated to the microservice provided by each of the physical devices and each of the microservice subunits 131 and in the cluster are continuously monitored through the interface of the running platform. By collecting the running logs of the microservices provided by each of the physical devices and each of the microservice subunits 131 in each cluster, and analyzing the collected log level and log content, the health states of the microservices provided by each of the physical devices and each of the microservice subunits 131 in each cluster running at different time points are evaluated according to analysis results.

Figure 4:
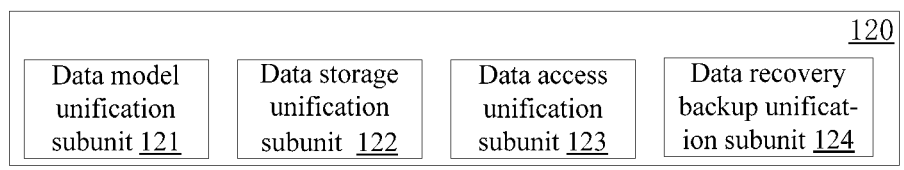
FIG. 4 is a schematic structure diagram of a data management unit in a network management system according to an example of the present disclosure.

In one possible example, the structure of the data management unit 120 may be as shown in FIG. 4, including a data model unification subunit 121, a data storage unification subunit 122, a data access unification subunit 123, and a data recovery backup unification subunit 124. In other possible examples, the data management unit 120 may also only include some subunits of all the subunits shown in FIG. 4, and may also include subunits not shown in FIG. 4, which is not limited in this example.

Wherein the data model unification subunit 121 is further to configure a UUID (universally unique identifier) for each network device in a target network managed by the network management system, so that the management function jointly implemented by the microservices provided by each group of the microservice subunits 131 enables to manage the network device according to the UUID of the network device.

Exemplarily, the data model unification subunit 121 may establish a unified data model for objects such as switches managed by the service for realizing each management function according to attributes of each of the objects. The attributes of the objects are composed of common attributes and extended attributes. The public attributes of objects include UUID, domain ID, type ID, management IP address and other public attributes, and extended attributes can be defined according to different objects. No matter what kind of service is used for device management, the data model unification subunit 121 will generate a unique object UUID through hash coding calculation of public attributes such as domain ID, type ID, and management IP address, etc. This ensures that the UUID of the object generated by the same device is the same whenever it is used. Each service can integrate and unify data and functions in different scenarios through the UUID of the object.

The data storage unification subunit 122 is to store data of all the microservice subunits 131 through the same data storage logic, so as to provide a unified data storage service for all the microservice subunits 131. The data storage services provided by the data storage unification subunit 122 include but not limited to: providing relational database services for storing relational data, providing cache database services for storing key-value type data, providing time series database services for storing time series type data, providing graph database services for storing data of graph structure type, and providing search engine database services for storing retrieve class data.

The data access unification subunit 123 is to encapsulate access logic of each type of data into the same access logic, and enabling all the microservice subunits 131 to access each type of data through the same access logic. The same access logic can be different according to different application scenarios. For example, the data access unification subunit 123 can perform interface encapsulation modeling of CRUD (Create Retrieve Update Delete) operations on the access to various types of data based on an RESTful (a design style and development method of network applications) protocol, and it is packaged into SDK to provide unified CRUD services for various business services. The microservices provided by each of the microservice subunits 131 perform data CURD operations on various types of databases through data service type, object model, or UUID of the object or other attribute parameters of the data service transmitted through the SDK or REST interface of the unified data access service. That is, the data access unification subunit 123 can encapsulate the access logic for each type of data into an SDK based on the RESTful protocol, and each of the microservice subunits 131 accesses various types of data by invoking the interface of the SDK.

The data backup and recovery unification subunit 124 can provide a unified backup and recovery service for data of the microservices provided by each of the microservice subunits 131, which can be backed up locally or remotely, and can be backed up regularly. The data storage management of the microservices provided by each of the microservice subunits 131 is unitarily provided by the data management unit 120. Therefore, each of the microservice subunits 131 does not need to pay attention to the data backup and recovery of the microservices provided by itself, but is unitarily backed up and recovered by the data management unit 120 according to backup and recovery strategy settings. The microservice provided by each of the microservice subunits 131 can register a strategy with the data management unit 120 during the installation and deployment. The registered strategy is used to represent a data backup mode and recovery mode of the microservice. For example, the registered strategy can be used to represent that the data backup mode of the microservice is cold backup and the recovery mode is cold load. For another example, the registered strategy can also be used to represent that the data backup mode of the microservice is hot backup and the recovery mode is hot load.

The data management unit 120 performs corresponding stop or restart operations on the microservices provided by each of the microservice subunits 131 through a unified running platform according to the registered strategy during backup and recovery. For example, a strategy registered by a microservice subunit 131 represents that the data backup mode of the microservice provided by this microservice subunit 131 is cold backup, and the data management unit 120 may restart the microservice subunit 131 when performing data backup for the microservice provided by the microservice subunit 131 to complete the cold backup of the data of the microservice provided by the microservice subunit 131. For another example, a strategy registered by a microservice subunit 131 represents that the data recovery mode of the microservice provided by the microservice subunit 131 is hot load, and the data management unit 120 may stop the microservice subunit 131 when performing data recovery for the microservice provided by the microservice subunit 131 to complete the hot load of the data of the microservice provided by the microservice subunit 131.

Figure 5:
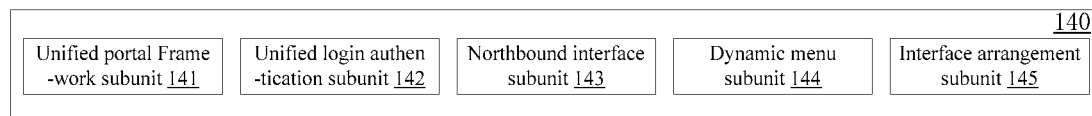
FIG. 5 is a schematic structure diagram of a display unit in a network management system according to an example of the present disclosure.

In one possible example, the structure of the display unit 140 may be as shown in FIG. 5, including a unified portal framework subunit 141, a unified login authentication subunit 142, a northbound interface subunit 143, a dynamic menu subunit 144, and an interface arrangement subunit 145. In other possible examples, the display unit 140 may also only include some subunits of all the subunits shown in FIG. 4, and may also include subunits not shown in FIG. 4, which is not limited in this example.

Wherein the unified portal framework subunit 141 is to display a main interface, and provide an interface for jumping to a functional interface of each of the microservice subunits 131 in the main interface, so as to provide a unified portal framework service for all the microservice subunits 131. That is, the unified portal framework subunit 141 has a function for displaying a main interface, and has a function of providing an interface for jumping to a functional interface of each of the microservice subunits 131 in the main interface, so that the unified portal framework subunit 141 provides a unified portal framework service for all the microservice subunits 131 through these two functions.

Wherein the form of the interface may be different according to different application scenarios. For example, in one possible example, the interface may be a control for jumping to a functional interface of each of the microservice subunits 131 in the main interface. In other possible example, the interface may be an input box for inputting a URL (uniform resource locator) by the user in the main interface, and jumping to a functional interface of the microservice subunit 131 corresponding to the URL according to the URL input by the user.

Exemplarily, the unified portal framework subunit 141 may provide a unified login entrance and a page rendering display framework for the microservices provided by each of the microservice subunits 131. The microservices provided by each of the microservice subunits 131 only need to provide an interface related to the business function. After the operator account login authentication is successful, it jumps to a specific business function page by analyzing a URL path of the specific business function page and an access route registered with the display layer during the deployment of the microservices provided by each of the microservice subunits 131. The unified portal framework subunit 141 can provide the entire display framework of the page in the form of a page template.

In one possible example, the top navigation and left menu area of the page can also be rendered and displayed by the unified portal framework subunit 141, and the business function content part is embedded in the content area of the business function page through web (network) page code fragments or iframe (a type of page element).) frame.

The unified login authentication subunit 142 provides unified login authentication for the microservices provided by each of the microservice subunits 131, including a login interface, access strategy, password authentication, and docking with external authentication systems, such as LDAP (Lightweight Directory Access Protocol), etc. The unified login authentication subunit can intercept access requests of the microservices provided by each of the microservice subunits 131 through a filter, and authenticate and confirm the logged-in operator account. If it is confirmed that the authentication has been performed, then the processing of the access requests is continued, otherwise jumping to the login portal page to authenticate the logged-in operator account.

The northbound interface subunit 143 provides a unified northbound gateway for the microservices provided by each of the microservice subunits 131, so as to provide a unified northbound access service for the microservices provided by each of the microservice subunits 131 to the outside. The microservices provided by each of the microservice subunits 131 register the routing URL of northbound access to a northbound gateway provided by the display layer during installation and deployment.

The dynamic menu subunit 144 is to determine a menu item corresponding to an access permission of an account logging in to the network management system according to a pre-stored correspondence between access permissions and menu items; and displaying the determined menu item.

Exemplarily, the dynamic menu subunit 144 may provide menu registration and rendering for the microservices provided by each of the microservice subunits 131. The microservices provided by each of the microservice subunit 131 register menus of single scene domain and cross scene domain in the dynamic menu subunit 144 in accordance with the menu registration model specification during the installation and deployment. After the operation account is logged in and authenticated, the dynamic menu subunit 144 may obtain the registered menu configuration, and render and display the menu items according to the menu configuration and access permission.

It can be understood that users can control the network management system to realize different functions through different menu items in the interface, and different users have different permissions, therefore some users may not have the permission to control the network management system to realize specific functions. Therefore, it is not necessary for these users to display the menu items used to realize these specific functions. That is, by selecting this example, the menu items can be correspondingly displayed according to the different user permissions, so as to simplify the displayed menu items and facilitate the user to find the required menu item in the interface.

The interface arrangement subunit 145 is to determine an interface element corresponding to an access permission of an account logging in to the network management system in the main interface according to a pre-stored correspondence between access permissions and interface elements; reset attributes of the determined interface element in the main interface; and display the reset main interface, wherein the interface element includes a menu item and/or a widget.

Exemplarily, the interface arrangement subunit 145 may provide a menu rearrangement service and a page content display rearrangement service for the microservices provided by each of the microservice subunits 131. The menu rearrangement service and the page content display rearrangement service are described respectively below.

The microservices provided by each of the microservice subunits 131 register the preset menus in the interface arrangement service during installation and deployment, and the interface arrangement service obtains the menu items within the permission of the currently logged-in and authenticated operator account through the entrance for menu rearrangement. One or more of the attributes such as names, opening modes, rendering priorities, hidden or not, parent-child relationship, etc. of these menu items are reset, the reset attributes are saved, the reset attributes of the menu items are loaded, and the main interface is rendered and redisplayed according to the loaded attributes. The attributes of each menu item in the redisplayed interface are theoretically the same as the attributes after resetting.

The microservices provided by each of the microservice subunits 131 may encapsulate the business service into one or more widgets and register the widgets in the interface arrangement service during installation and deployment, and the interface arrangement service obtains the widgets within the permission of the currently logged-in and authenticated operator account through the entrance for page content rearrangement. One or more of the attributes such as the titles, hidden or not, sizes, locations, styles, data source docking, etc. of widgets are reset, the reset attributes are saved, the reset attributes of the widgets are loaded, and the main interface is rendered and reset according to the loaded attributes. The attributes of each widget in the redisplayed interface are theoretically the same as the attributes after resetting.

It can be understood that in different network structures and different network scenarios, different parameters need to be configured for the network to enable the network to operate normally. In the traditional way of operation and maintenance, it is necessary to rely on relevant personnel to manually manage the configuration parameters of the network. However, when facing complex network structures and changeable network scenarios, it is difficult for relevant personnel to adjust configuration parameters of the network in time, so that the network cannot be in normal operation.

Figure 6:
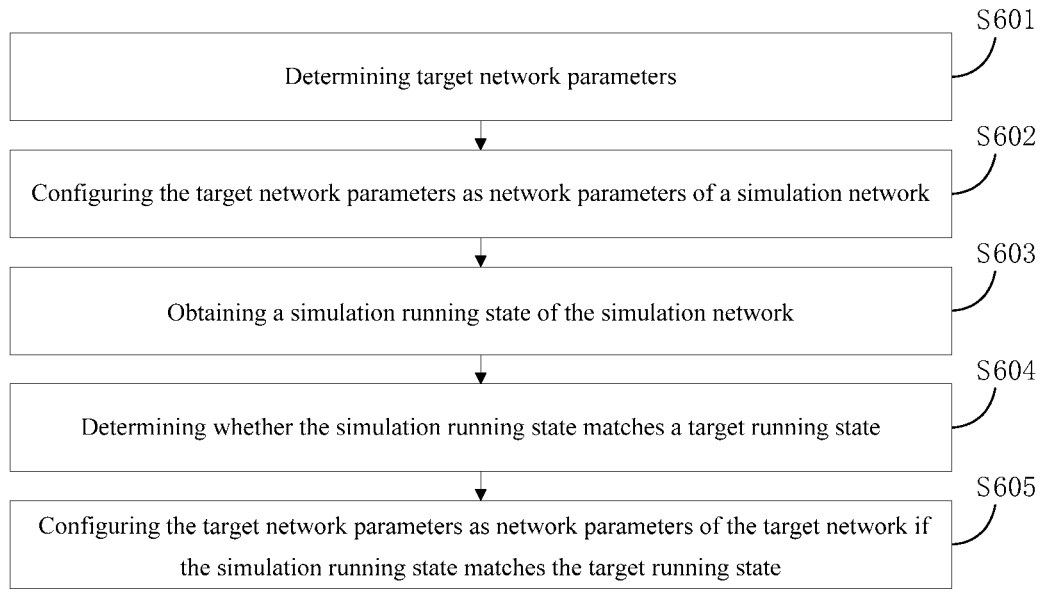
FIG. 6 is a schematic flow diagram of a network management method according to an example of the present disclosure.

Based on this, an example of the present disclosure provides a network management method, which is applied to any of the foregoing network management system. The method can be seen in FIG. 6, which is a schematic flow diagram of a network management method according to an example of the present disclosure, and may include:

S601, determining target network parameters;

S602: configuring the target network parameters as network parameters of a simulation network;

S603, obtaining a simulation running state of the simulation network;

S604, determining whether the simulation running state matches a target running state;

S605, configuring the target network parameters as network parameters of the target network if the simulation running state matches the target running state.

By selecting this example, network management products, controller products, and intelligent analysis products can be integrated in a business layer, so that the business of the three products are interconnected to form a closed loop of business autonomy, so as to automatically optimize the network, and there is no need for relevant personnel to manually optimize the network parameters, therefore the network can be effectively optimized in real time.

Wherein, in S601, the method for determining the target network parameters may be different according to different application scenarios. Exemplarily, when user intention or system intention is received, the target network parameters may be determined according to the received user intention or system intention. Wherein, the user intent is used to represent the running state of the target network expected by the user, and system intent is used to represent the running state of the target network expected by the management system.

The user intention can be input by users according to actual needs, and the system intention can be generated by the system according to preset rules. The user intention or the system intention can be identified, so as to obtain the target network parameters corresponding to the user intention or the system intention.

Exemplarily, in one possible example, obtaining the target running state, and inputting the target running state to an inference model to obtain target network parameters output by the inference model, wherein the inference model is a pre-trained model for inferring the network parameters according to the input target running state.

In addition, the inference model may be an algorithm model obtained based on traditional machine learning training, or a neural network model obtained based on deep learning training, which is not limited in this example.

It can be understood that the accuracy of the trained inference model is often limited due to the limited quality and quantity of samples used when training the inference model. In order to further improve the accuracy of the inference model, in one possible example, the current network parameters and current running states of the target network can be obtained, and the current running states can be input to the inference model to obtain inference running parameters output by the inference model, and the inference model is updated according to the differences between the inference running parameters and the current network parameters.

Wherein, the current network parameters and current running states of the target network are the network parameters and running states of the target network at a certain moment collected during the running of the target network. It can be understood that the current network parameters are the real network parameters when the target network is in the current running state. Therefore, without considering the error of the inference model, the current running state is theoretically input to the inference model, and the obtained inference network parameters should be the current network parameters.

However, due to the fact that there are errors in the inference model, there are certain differences between the inference network parameters and the current network parameters, and the inference model can be updated according to the differences, so as to further improve the accuracy of the inference model.

In S603, the simulation network is constructed based on the target network managed by the network management system, and is used to simulate the target network. The simulation network environment where the simulation network is located should be the same or similar to the network environment where the target network is located.

In S604, the simulation running state is the running state of the target network when the network parameters of the target network obtained by simulation are the target network parameters, and is not the actual running state when the network parameters of the target network are the target network parameters. In one possible example, a simulated network verification environment can be built according to the target network parameters, and the simulation is performed under the simulated network verification environment to obtain a simulation running state.

In S605, the target running state is the expected running state of the target network. For example, assuming that the target network parameters are determined according to the user intention or the system intention, the target running state may be the running state represented by the user intention or the system intention.

The matching between the simulation running state and the target running state can mean that the simulation running state is the same as the target running state, it can also mean that the simulation running state is better than the target running state, or it can mean that the difference between the simulation running state and the target running state is less than the preset threshold.

Exemplarily, assuming that the CPU load rate in the target running state is 50%, in one possible example, the simulation running state can be considered as matched with the target running state when the CPU load rate in the simulation running state is also 50%, or when the CPU load rate in the simulation running state is less than 50%, or when the CPU load rate in the simulation running state differs from 50% by less than 10%.

In S604, it can be understood that when the simulation running state matches the target running state, it can be considered that when the network parameters of the target network are the target network parameters, the target network can run in the expected running state, and the target network parameters can be used as the network parameters of the target network.

However, when the simulation running state does not match the target running state, it can be considered that when the network parameters of the target network are the target network parameters, the target network cannot run in the expected running state, and the target network parameters cannot be used as the network parameters of the target network.

In addition, in one possible example, in order to facilitate the user to manage the network, the simulation running state may be displayed, and the user determines whether it is necessary to manually optimize the target network according to the displayed simulation running state. Exemplarily, if the displayed simulation running state meets the user intention, it can be considered that the target network can be automatically optimized according to the target network parameters, and the user does not need to manually optimize the target network at this time. And if the displayed simulation running state does not meet the user intention, it can be considered that the target network cannot be automatically optimized according to the target network parameters, and the user needs to manually optimize the target network at this time.

When the simulation running state matches the target running state, the network parameters of the target network are set as the target network parameters. When the simulation running state does not match the target running state, the target network parameters are re-determined, and the above block of S602 is performed again.

Figure 7:
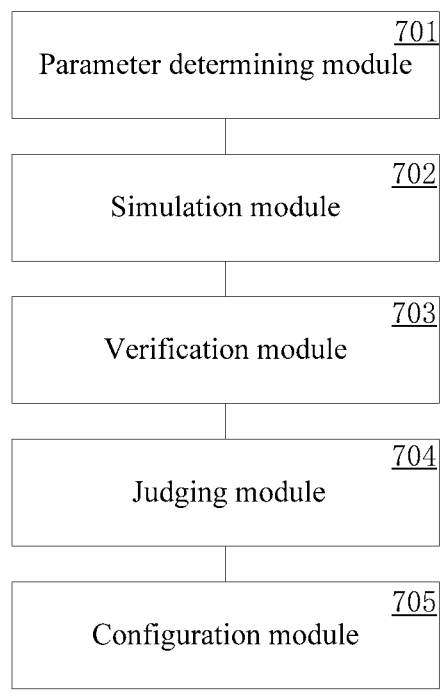
FIG. 7 is a schematic structure diagram of a network management apparatus according to an example of the present disclosure.

Refer to FIG. 7, which is a schematic structure diagram of a network management apparatus according to an example of the present disclosure. The network management apparatus may include:
 a parameter determining module 701 to determine target network parameters;
 a simulation module 702 to configure the target network parameters as network parameters of a simulation network that is constructed based on a target network managed by a network management system;
 a verification module 703 to obtain a simulation running state of the simulation network;
 a judging module 704 to determine whether the simulation running state matches a target running state;
 a configuration module 705 to configure the target network parameters as network parameters of the target network if the simulation running state matches the target running state.

In one possible example, the simulation module 702 is further to re-determine new target network parameters, and return to perform the step of configuring the target network parameters as the network parameters of the simulation network that is constructed based on the target network managed by the network management system if the simulation running state does not match the target running state.

In one possible example, the parameter determining module 701 is specifically to obtain a target running state;
 input the target running state to an inference model to obtain target network parameters output by the inference model, wherein the inference model is a pretrained model for inferring network parameters of a network according to the input target running state.

In one possible example, the apparatus further includes a model update module to obtain current network parameters and a current running state of the target network;
  input the current running state to the inference model to obtain inference network parameters output by the inference model;
  update the inference model according to the differences between the inference network parameters and the current network parameters.

Figure 8:
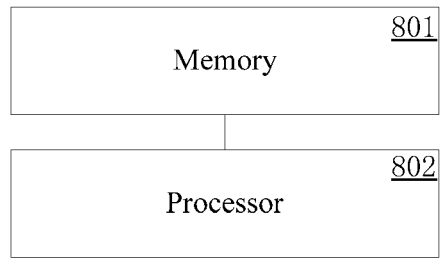
FIG. 8 is a schematic structure diagram of an electronic device according to an example of the present disclosure.

The example of the present disclosure further provides an electronic device, as shown in FIG. 8, including:
  the memory 801 to store a computer program;
  the processor 802 to implement the followings when executing the program stored on the memory 801:
  determining target network parameters;
  configuring the target network parameters as network parameters of a simulation network that is constructed based on a target network managed by the network management system;
  obtaining a simulation running state of the simulation network;
  determining whether the simulation running state matches a target running state;
  configuring the target network parameters as network parameters of the target network if the simulation running state matches the target running state.

The communication bus aforementioned in the electronic device may be a peripheral component interconnect (PCI) bus or an extended industry standard architecture (EISA) bus and the like. The communication bus can include an address bus, a data bus, a control bus, or the like. For representation, only one thick line is shown in the figure, which does not mean there is only one communication bus or one type of communication bus.
  the communications interface is used for the communication between the aforementioned electronic device and other devices.

The memory can include a random access memory (RAM), or can include a non-volatile memory (NVM), for example at least one disk memory. Optionally, the memory can also be at least one storage device located away from the processor described above.

The processor described above may be a general-purpose processor, such as a central processing unit (CPU), a network processor (NP); it may also be a digital signal processor (DSP), an application specific integrated circuit (ASIC), field-programmable gate array (FPGA) or other programmable logic devices, discrete gate or transistor logic devices, discrete hardware components.

Another example of the present disclosure provides a computer readable storage medium. The computer readable storage medium stores a computer program thereon which, when executed by a processor, causes the processor to implement the network management method described above.

In still another example according to the present invention, there is also provided a computer program product with instructions that, when running on a computer, cause the computer to perform the network management method described in any one of the examples described above.

In the aforementioned examples, it may be implemented in whole or in part by software, hardware, firmware, or any combination thereof. When implemented by software, it may be implemented in whole or in part in the form of a computer program product. The computer program product includes one or more computer instructions. The processes or functions described in accordance with the examples of the present invention is produced in whole or in part, when the computer program instructions are loaded and executed on a computer. The computer may be a general-purpose computer, a dedicated computer, a computer network, or other programmable device. The computer instructions may be stored in a computer-readable storage medium or may be transmitted from one computer-readable storage medium to another computer-readable storage medium, for example, the computer instructions may be transmitted from a web site, a computer, a server, or a data center to another web site, another computer, another server, or another data center via a cable (such as a coaxial cable, an optical fiber, a digital subscriber line (DSL)) or wireless (such as infrared, wireless, microwave, etc.). The computer-readable storage medium may be any available medium that may be accessed by a computer or an integrated data storage device such as a server or a data center containing one or more available medium. The available media may be magnetic media (such as floppy disks, hard disks, magnetic tapes), optical media (such as DVDs), or semiconductor media (such as solid state disk (SSD)), etc.

It should be noted that, the relationship terms herein such as "first", "second" and the like are only used to distinguish one entity or operation from another entity or operation, but do not necessarily require or imply that there is actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a." or "include(s) a." do not exclude that there are other identical elements in the processes, methods, articles, or devices which include these elements.

All the examples are described in corresponding ways, same or similar parts in each of the examples can be referred to one another, and the parts emphasized are differences to other examples. It should be noted that, for examples of the apparatus, electronic device, computer readable storage medium, and computer program product, since they are substantially similar to the examples of the method, their description is relatively simple, and for the related aspects, one only needs to refer to portions of the description of the examples of the method.

The examples described above are merely preferred examples of the present disclosure, and not intended to limit the scope of the present disclosure. Any modifications, equivalents, improvements or the like within the spirit and principle of the present disclosure should be included in the protection scope of the present disclosure.

What is claimed is:

1. A network management system, wherein the network management system comprises a processor and a memory in communication with the processor, the memory stores instructions related to a support unit, a data management unit, a business service unit, and a display unit, wherein the processor executes the stored instructions to direct the support unit, the data management unit, the business service unit, and the display unit to:
  the business service unit comprises multiple groups of microservice subunits;

each of the microservice subunits provides a type of microservice, and microservices provided by each group of the microservice subunits are jointly used to implement one management function;

the support unit performs installation and deployment on all the microservice subunits through a same installation and deployment logic, so as to provide a unified deployment platform for all the microservice subunits, the support unit performs operation management on all the microservice subunits through a same operation management logic, so as to provide a unified operation platform for all the microservice subunits, and the support unit further performs unified message modeling and encapsulation on protocols used in all the microservices provided by all the microservice subunits, so as to provide a unified protocol channel service for all the microservice subunits;

the data management unit stores data of all the microservice subunits through a same data storage logic, so as to provide a unified data storage service for all the microservice subunits;

and the data management unit encapsulates an access logic of each type of data into a same access logic, and enables all the microservice subunits to access each type of data through the same access logic;

the display unit displays a main interface, and provides an interface for jumping to a functional interface of each of the microservice subunits in the main interface, so as to provide a unified portal framework service for all the microservice subunits.

2. The system of claim 1, wherein the display unit is further to determine a menu item corresponding to an access permission of an account logging in to the network management system according to a pre-stored correspondence between access permissions and menu items; and display the determined menu item in the main interface.

3. The system of claim 1, wherein the display unit is further to determine an interface element corresponding to an access permission of an account logging in to the network management system in the main interface according to a pre-stored correspondence between access permissions and interface elements; reset attributes of the determined interface element in the main interface; display the reset main interface, wherein the interface element comprises a menu item and/or a widget.

4. The system of claim 1, wherein the support unit is further to obtain logs generated by all the microservices provided by all the microservice subunits, and perform log management on all obtained logs through a same log management logic, so as to provide a unified log service for all the microservice subunits.

5. The system of claim 1, wherein the data management unit is further to configure a universally unique identifier UUID for each network device in a target network managed by the network management system, so that a management function jointly implemented by microservices provided by each group of the microservice subunits enables to manage the network device according to the UUID of the network device.

6. A network management method including a business service unit wherein the business service unit comprises multiple groups of microservice subunits wherein each of the microservice subunits provides a type of microservice, and microservices provided by each group of the microservice subunits are jointly used to implement one management function, the method comprises:

performing, by a support unit, installation and deployment on all the microservice subunits through a same installation and deployment logic, so as to provide a unified deployment platform for all the microservice subunits, the support unit performs operation management on all the microservice subunits through a same operation management logic, so as to provide a unified operation platform for all the microservice subunits, and the support unit further performs unified message modeling and encapsulation on protocols used in all the microservices provided by all the microservice subunits, so as to provide a unified protocol channel service for all the microservice subunits;

storing, by a data management unit, data of all the microservice subunits through a same data storage logic, so as to provide a unified data storage service for all the microservice subunits;

encapsulating, by the data management unit, an access logic of each type of data into a same access logic, and enables all the microservice subunits to access each type of data through the same access logic;

providing, in a display unit displaying a main interface, an interface for jumping to a functional interface of each of the microservice subunits in the main interface, so as to provide a unified portal framework service for all the microservice subunits; and wherein the method further comprises:
  determining target network parameters;
  configuring the target network parameters as network parameters of a simulation network that is constructed based on a target network managed by the network management system;
  obtaining a simulation running state of the simulation network;
  determining whether the simulation running state matches a target running state;
  configuring the target network parameters as network parameters of the target network if the simulation running state matches the target running state.

7. The method of claim 6, further comprising:
if the simulation running state does not match the target running state, re-determining new target network parameters and returning to perform the step of configuring the target network parameters as network parameters of a simulation network that is constructed based on a target network managed by the network management system.

8. The method of claim 6, wherein determining target network parameters further comprises:
  obtaining a target running state;
  inputting the target running state to an inference model to obtain target network parameters output by the inference model, wherein the inference model is a pre-trained model for inferring network parameters of a network according to the input target running state.

9. The method of claim 8, further comprising:
  obtaining current network parameters and a current running state of the target network;
  inputting the current running state to the inference model to obtain inference network parameters output by the inference model;
  updating the inference model according to differences between the inference network parameters and the current network parameters.

10. A network management apparatus wherein the network management apparatus includes a processor and a memory in communication with the processor, the memory stores instructions related to a support unit, a data management unit, a business service unit, and a display unit, wherein the processor executes the stored instructions to direct the support unit, the data management unit, the business service unit, and the display unit to:

the business service unit comprises multiple groups of microservice subunits;

each of the microservice subunits provides a type of microservice, and microservices provided by each group of the microservice subunits are jointly used to implement one management function;

the support unit performs installation and deployment on all the microservice subunits through a same installation and deployment logic, so as to provide a unified deployment platform for all the microservice subunits, the support unit performs operation management on all the microservice subunits through a same operation management logic, so as to provide a unified operation platform for all the microservice subunits, and the support unit further performs unified message modeling and encapsulation on protocols used in all the microservices provided by all the microservice subunits, so as to provide a unified protocol channel service for all the microservice subunits;

the data management unit stores data of all the microservice subunits through a same data storage logic, so as to provide a unified data storage service for all the microservice subunits;

and the data management unit encapsulates an access logic of each type of data into a same access logic, and enables all the microservice subunits to access each type of data through the same access logic; and the display unit displays a main interface, and provides an interface for jumping to a functional interface of each of the microservice subunits in the main interface, so as to provide a unified portal framework service for all the microservice subunits;

wherein the apparatus comprises instructions stored in memory executed by the processor to implement:

a parameter determining module to determine target network parameters;

a simulation module to configure the target network parameters as network parameters of a simulation network that is constructed based on a target network managed by the network management system;

a verification module to obtain a simulation running state of the simulation network;

a judging module to determine whether the simulation running state matches a target running state;

a configuration module to configure the target network parameters as network parameters of the target network if the simulation running state matches the target running state.

* * * * *